(12) United States Patent
Wong et al.

(10) Patent No.: US 7,269,608 B2
(45) Date of Patent: Sep. 11, 2007

(54) APPARATUS AND METHODS FOR CACHING OBJECTS USING MAIN MEMORY AND PERSISTENT MEMORY

(75) Inventors: Thomas K. Wong, Pleasanton, CA (US); Panagiotis Tsirigotis, Mountain View, CA (US); Sanjay R. Radia, Fremont, CA (US); Rajeev Chawla, Union City, CA (US); Omid Ahmadian, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 491 days.

(21) Appl. No.: 10/137,443

(22) Filed: May 3, 2002
(Under 37 CFR 1.47)

(65) Prior Publication Data

US 2004/0111443 A1    Jun. 10, 2004

Related U.S. Application Data

(60) Provisional application No. 60/304,173, filed on May 30, 2001.

(51) Int. Cl.
*G06F 17/30* (2006.01)
(52) U.S. Cl. ................. 707/201; 707/10; 707/101
(58) Field of Classification Search ............. 707/3, 707/4, 100–104.1, 202, 1, 10, 200; 711/202, 711/209, 203, 110, 216, 113, 117
See application file for complete search history.

(56) References Cited

U.S. PATENT DOCUMENTS

| 5,535,412 | A | * | 7/1996 | Nadehara ............... 711/110 |
| 5,584,038 | A | * | 12/1996 | Papworth et al. .......... 711/110 |
| 6,021,408 | A | * | 2/2000 | Ledain et al. ............... 707/8 |
| 6,081,883 | A | * | 6/2000 | Popelka et al. ............ 711/121 |
| 6,128,627 | A | * | 10/2000 | Mattis et al. ............. 707/202 |
| 6,253,271 | B1 | * | 6/2001 | Ram et al. ................ 709/212 |
| 6,289,358 | B1 | * | 9/2001 | Mattis et al. ............. 707/100 |
| 6,363,470 | B1 | * | 3/2002 | Laurenti et al. ........... 711/220 |
| 6,389,510 | B1 | * | 5/2002 | Chen et al. ............... 711/113 |
| 6,397,318 | B1 | * | 5/2002 | Peh ........................... 711/220 |
| 6,453,319 | B1 | * | 9/2002 | Mattis et al. ............. 707/100 |

(Continued)

FOREIGN PATENT DOCUMENTS

WO    WO 00/62154    * 10/2000

*Primary Examiner*—Jean M. Corrielus
(74) *Attorney, Agent, or Firm*—Park, Vaughan & Fleming LLP

(57) ABSTRACT

An object cache stores objects in a cyclic buffer to provide highly efficient creation of cache entries. The cache efficiently manages storage of a large number of small objects because the cache does not write objects into a file system as individual files, rather the cache utilizes cyclical buffers in which to store objects as they are added to the cache. Because of the use of a cyclic buffer, the high-overhead process of purging cache entries never needs to be performed. Cache entries are automatically purged as they are overwritten when the cyclic buffer becomes full and the input pointer wraps around from the end of a cyclic buffer to the beginning of a cyclic buffer. Additionally, in the event of a system crash or disk subsystem malfunction, inspect and repair time is independent of the size of the cache, as opposed to conventional file systems in which the time is proportional to the size of the file system.

29 Claims, 10 Drawing Sheets

U.S. PATENT DOCUMENTS

| | | | |
|---|---|---|---|
| 6,473,846 B1 * | 10/2002 | Melchior | 707/100 |
| 6,578,105 B2 * | 6/2003 | Finn et al. | 711/110 |
| 6,598,119 B2 * | 7/2003 | Becker et al. | 711/119 |
| 6,732,124 B1 * | 5/2004 | Koseki et al. | 707/202 |
| 6,754,800 B2 * | 6/2004 | Wong et al. | 711/216 |
| 6,807,615 B1 * | 10/2004 | Wong et al. | 711/202 |
| 2002/0016911 A1 * | 2/2002 | Chawla et al. | 713/153 |
| 2002/0184441 A1 * | 12/2002 | Wong et al. | 711/113 |
| 2003/0093645 A1 * | 5/2003 | Wong et al. | 711/216 |
| 2003/0115420 A1 * | 6/2003 | Tsirigotis et al. | 711/133 |
| 2003/0212863 A1 * | 11/2003 | Ganguly et al. | 711/118 |

* cited by examiner

APPARATUS AND METHODS FOR CACHING OBJECTS USING MAIN MEMORY AND PERSISTENT MEMORY

BENEFIT OF PRIORITY

The present application claims benefit of priority of U.S. Provisional Patent Application No. 60/304,173 filed on May 30, 2001.

RELATED APPLICATION

The present application is related to U.S. patent application Ser. No. 09/288,023, filed Apr. 8, 1999, which issued on Oct. 19, 2004 as U.S. Pat. No. 6,807,615 and is incorporated herein in its entirety.

DESCRIPTION OF THE INVENTION

1. Field of the Invention

The present invention relates generally to caching objects in a computer system and in particular to an apparatus and method for caching objects using main memory and persistent memory to increase caching performance of persistent memory and improve recovery from file system crashes.

2. Background of the Invention

The Internet is a global network of inter-connected computer systems that is widely used to access a vast array of information. A web server is an Internet-connected computer system that can provide information to Internet-connected web client computers. The provided information is accessed in units that are sometimes called objects. The objects may be web objects, for example. Web clients connect to web servers and access web objects. The primary web server from which a web object originates may be called an origin web server or simply an origin server.

As Internet access becomes more popular, less expensive and faster, and as the number of web clients increases, so does the number of connections made to particular origin servers. This increased number of connections can increase both network load and server load, sometimes causing parts of the Internet and particular origin servers to become so overloaded that they provide poor responses or even become inaccessible. Web cache systems can be used to reduce both network load and origin server load by migrating copies of popular documents from origin servers to cache servers. Web cache systems also provide faster responses to client computer systems. Cache servers may reside on a network, in locations close to particular web clients. Closeness or proximity in a networking context generally refers to the number of intermediate network segments data must traverse to move from client to server. By locating a caching system "closer" to clients, data may take a shorter path between the caching system and the client than the path necessary to transmit data from a corresponding origin server to the client. Therefore, placing caching systems closer to clients generally improves response times and decreases network load.

Various means for caching data are often used in computer systems to reduce system loads by storing copies of frequently accessed information in places closer to where the information is likely to be needed. In response to a request from an information requester, a cache system determines whether the information is cached. If not, it is called a cache miss, and the cache system requests the information from the appropriate information provider and caches a copy of the information. If the information is already in the cache, it is called a cache hit. In either case, the information is then forwarded to the requester. By thus reducing loads and locating data closer to where it is needed, caching systems make data access faster and more efficient.

Cache systems can therefore improve the speed of information transfer between an information requester and an information provider. Cache systems generally include a high-speed memory that stores information frequently requested or most recently requested from an information provider by an information requester. A cache is often used in networks to expedite transferring information between a client, the information requester, and an origin server, the information provider.

A protocol defines how the client and origin server communicate. The Internet, for example, uses protocols such as the Hypertext Transfer Protocol ("HTTP") to transfer web objects. In HTTP, a client sends a service request message to the origin server. For example, the service request message might include a request method to be performed on an object in the origin server. The object is identified in the service request message by a uniform resource locator ("URL"), which is a path to the object. The origin server responds to the service request message by performing the method in the request method. The request method may be a retrieve operation, which causes the origin server to retrieve the object identified by the URL and transmit it to the requesting client.

A proxy server is often used as an intermediary between a client and an origin server. Instead of the service request message being sent to the origin server, it may be routed to a proxy server. The proxy server handles the request by forwarding it to the origin server, receiving the requested information from the origin server, and transmitting the requested information to the client.

To expedite retrieval of the requested information, a conventional proxy server often also acts as a cache, storing retrieved information in a local cache in the proxy server. When a caching proxy server receives a service request message from a client, it first determines whether the information requested by the service request message is already stored locally in the proxy server cache. If the requested information is stored in the proxy server cache, it is retrieved from the cache and returned to the client. If the information is not stored in the proxy server cache, the proxy server requests the information from the origin server. When the caching proxy server receives the requested information from the origin server, it sends the information to the client and also caches the information in the local proxy server cache. Caching can alternatively or additionally be done at other locations in the system. For example, a web browser can cache information locally at the client.

Some time after an object is cached, it may be modified on the origin server. Therefore, if a client obtains an object from a cache server instead of the origin server, the client bears some risk that the cached object may not correspond to the most up-to-date web object on the origin server. When a cached object becomes out-of-date, it is sometimes referred to as being stale. Additionally, the longer an object remains in cache, the greater potential likelihood that it will be stale. In order to mitigate the problem of stale objects, web caches frequently maintain expiration dates in conjunction with objects. When a web client requests a web object that is expired, a web cache system will fetch a new copy of the expired web object from the corresponding origin server, replacing the expired object in the cache with the newly fetched object. Expired objects that have not been accessed for a predetermined time are periodically purged from the cache.

Ideally, a cache would be implemented entirely in fast main memory. In general, however, this is not practical because implementing a sufficiently large cache with only main memory would be prohibitively expensive. Moreover, when a computer crashes, such as when power goes down, fast main memory loses all of its data.

One solution to this problem is to implement a first part of a cache in main memory, and a second part of the cache in persistent memory, such as disk storage. Because persistent memory does not lose data when a computer system crashes, at least part of the cache is retained upon power loss, even though the data in main memory cache is lost.

Persistent memory has drawbacks. One problem with persistent memory is that it is slow. If there are large numbers of relatively small objects being written to and read from a traditional file system stored in persistent memory, a system can be unacceptably slow. For example, typical HTML documents may be as small as 10K, or even smaller, and there may be many such objects that need to be cached. Using a traditional file system for storing individual cached objects as small files is generally inefficient for several reasons.

Internet or web caching systems ordinarily experience hit-rates of approximately 30%. This means that roughly 70% percent of the time a caching system will experience a cache miss, meaning a requested object is not found in the cache. When a cache miss is experienced, an old cache entry may be deleted to make room for an object corresponding to the object requested in the cache miss. In a traditional file system, deleting an old entry and adding a new entry involves writing to directory structures, file descriptors, and blocks containing the data corresponding to the content of the object itself. This process results in a relatively large number of writes, all potentially in different physical locations of the persistent storage medium. Traditional file systems are not well suited to this type of writing of small pieces of information.

Traditional file systems are not designed to run at 100% capacity, while a cache will ideally make full use of whatever storage capacity is available to it. When a traditional file system becomes nearly completely full, performance degrades and reads and writes are slower than on a traditional file system having some free space. This is particularly true when the traditional file system is full of small files.

When a traditional file system is used to store a multitude of small files in a relatively flat directory structure, directory traversal must be performed each time a file is read and written. Having many large files leads to having large directory lists, and traversing large directory lists in a traditional file system is costly in terms of time. The ability of a cache system to perform rapidly is degraded by slow directory traversal in a traditional file system.

The Berkeley UNIX file system ("ufs") is one example of a system sometimes used to implement cache on disk. More particularly, ufs uses synchronous disk input and output ("I/O") operations during file creation and deletion to update a directory containing files to be created or deleted. A cache using ufs to store web objects as individual files suffers from a drastic drop in throughput due to idle time spent waiting for the disk I/O completions when creating or removing individual files containing web objects.

Another problem with traditional file systems involves recovery after a file system crash. To recover from a file system crash, the proxy server performs a file system check ("fsck") to recreate the file system prior to the crash to the extent possible. With large persistent memory, however, fsck may take a long time, because the process of repairing a traditional file system is proportional to its size. Because it takes so long to repair a large file system containing cached objects as individual files, a common solution is to simply reinitialize the file system. However, reinitialization has the drawback of losing all of the cached documents, which temporarily eliminates the benefits of a cache, until the cache begins to accumulate new objects that are added to the cache as a result of cache misses.

What is needed, then, is a system which allows high performance use of persistent memory and provides quick recovery in the event of a file system crash without requiring the loss of all data.

SUMMARY OF THE INVENTION

Methods and systems, consistent with the present invention, provide an object cache by using cyclic buffers in conjunction with fast main memory and persistent memory. First, the systems and methods receive an object from an origin server. Next, they store the object in a plurality of data structures comprising three elements. The first element is a cyclic index buffer capable of storing index entries comprising an index. The second element is a cyclic object buffer capable of storing and retrieving objects by logical block number. The third element is a metadata buffer capable of storing information about the index buffer and the object buffer.

Methods and systems consistent with the present invention are applicable to caching web content, data files, binary executable files, and other types of information. Although a web caching system is provided as an exemplary embodiment, a person of ordinary skill will appreciate that the present invention may be practiced in connection with other types of caching systems without departing from the scope of the present invention as claimed.

Additional benefits of the present invention will be set forth in part in the description which follows, and in part will be obvious from the description, or may be learned by practice of the invention. The benefits of the present invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the present invention. In the drawings.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

Systems, methods, and articles of manufacture consistent with the caching scheme disclosed and claimed herein provide the advantages of main memory and persistent memory caching with improved performance and failure recovery as compared to conventional systems. Systems and methods consistent with the improved cyclic buffer disclosed herein use an index to map consecutively numbered logical blocks to physical buffer blocks of a cyclic buffer. Cyclic buffers consistent with the present invention are disclosed in related U.S. patent application Ser. No. 09/288,023, filed Apr. 8, 1999, which is incorporated herein by reference in its entirety. The index to the cyclic buffer is implemented using the logical block numbers. When new information is added to the cyclic buffer, the next logical block number is assigned to the information. The new logical block number corresponds to a physical cyclic buffer block. The new logical block number and key associated with the information are then added to the index. The mapping of logical block numbers to physical block numbers may simply be a mathematical formula that defines the relationship between the logical block numbers and physical block numbers.

To retrieve information from the cyclic buffer, the index is first scanned to determine whether an index entry exists that has a key associated with the information. If such a key is present, the entry is accessed to determine the logical block number associated with the key. The logical block number is then mapped to a physical block number, and the physical block number is used to access the cyclic buffer.

In one implementation, a logical block number C is converted into a physical block number by determining a remainder after dividing the block number C by the number of blocks N in the buffer (i.e., C/N). The logical block number can be used to determine which blocks are the newest, as well as whether the block is valid. The newest block is the block having the highest logical block number. The block is a valid block if the logical block number being requested is within the range of logical block numbers currently being used to implement the buffer. Thus, logical block numbers are used to both identify the blocks within a cyclic buffer and to determine whether a block has been overwritten (i.e., is invalid).

In one implementation of a cyclic buffer consistent with the invention, a caching proxy server retrieves information from a network and stores the information in the cyclic buffer using a logical block buffer control mechanism. This allows the information to be accessed at a later time without retrieving it from the network.

Figure 1:
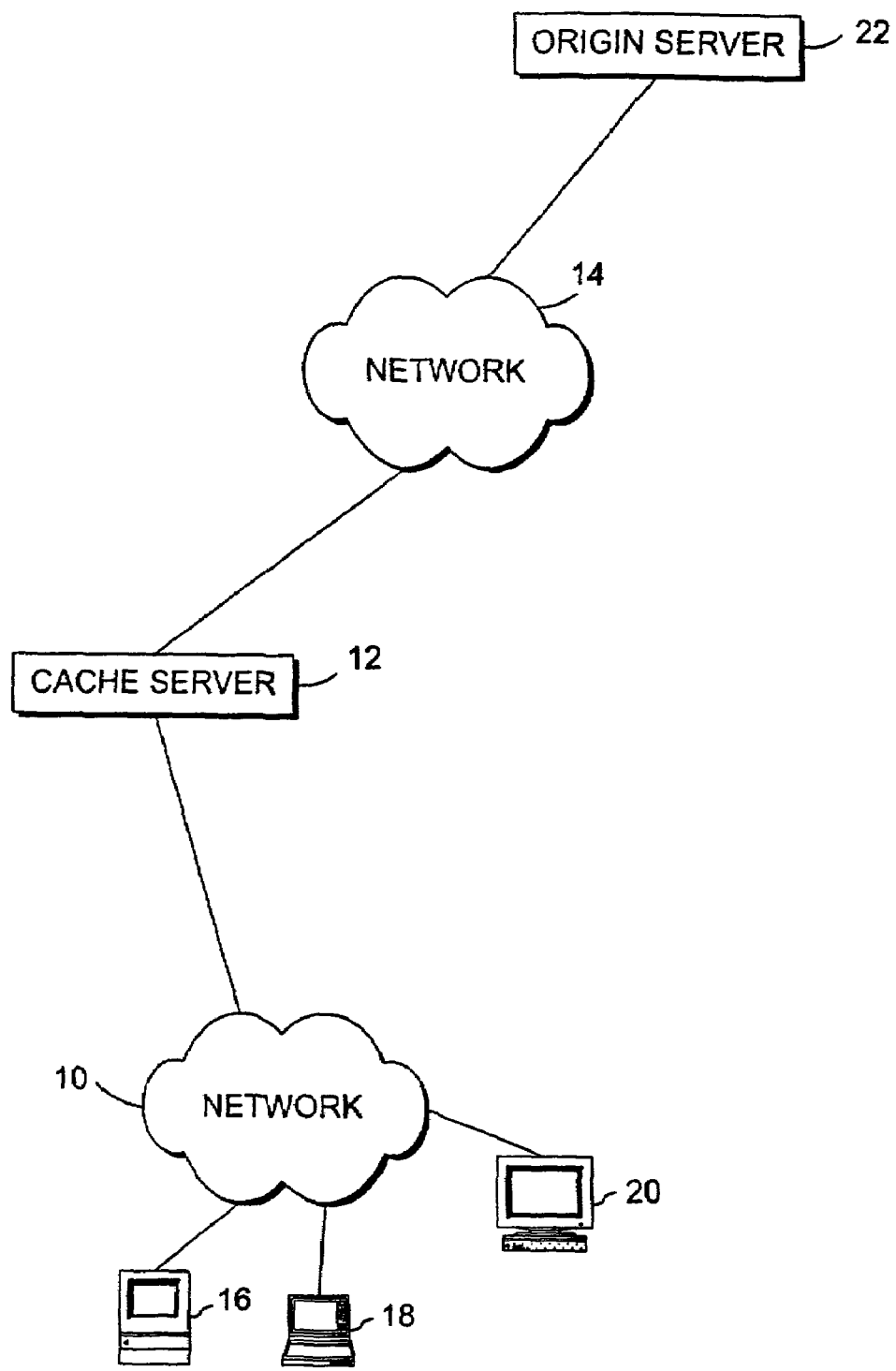
FIG. 1 is a block diagram showing a system implementing a proxy server consistent with the present invention.

FIG. 1 is a block diagram showing a system implementing a cache server consistent with the present invention. Clients 16, 18, and 20 are connected to network 10. Cache server 12, connected between network 10 and network 14, handles service requests from clients 16, 18, and 20. In response to a service request for information from one of the clients, such as client 16, cache server 12 either returns the information from its local cache, or retrieves the information from origin server 22 and forwards the information to client 16. If the information is retrieved from origin server 22, cache server 12 also caches the information locally for later use. Caching the information allows cache server 12 to quickly provide the information to a client at a later time if the same information is requested again.

The apparatus and methods consistent with the invention are related to cache servers and proxy server caching. A cache server consistent with the invention may be implemented in whole or in part by one or more sequences of instructions, executed by cache server 12, which carry out the apparatus and methods described herein. Such instructions may be read by cache server 12 from a computer-readable medium, such as a storage device. Execution of sequences of instructions by cache server 12 causes performance of process steps consistent with the present invention described herein. Execution of sequences of instructions by cache server 12 may also be considered to implement apparatus elements that perform the process steps. Hard-wired circuitry may be used in place of or in combination with software instructions to implement the invention. Thus, embodiments of the invention are not limited to any specific combination of hardware circuitry and software.

The term "computer-readable medium" as used herein refers to any medium that may store instructions for execution. Such a medium may take many forms, including but not limited to, non-volatile memory media, volatile memory media, and transmission media. Non-volatile memory media includes, for example, optical or magnetic disks. Volatile memory media includes RAM. Transmission media includes, for example, coaxial cables, copper wire and fiber optics, including the wires. Transmission media can also take the form of acoustic or light waves, such as those generated during radio wave and infrared data communications.

Common forms of computer-readable media include, for example, a floppy disk, a flexible disk, hard disk, magnetic tape, or any other magnetic storage medium, a CD-ROM, DVD, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read and use.

Various forms of computer-readable media may be involved in carrying one or more sequences of instructions for execution to implement all or part of the cyclic cache described herein. For example, the instructions may initially be carried on a magnetic disk or a remote computer. The remote computer can load the instructions into its dynamic memory and send the instructions over a telephone line using a modem. A modem local to a computer system can receive the data on the telephone line and use an infrared transmitter to convert the data to an infrared signal. An infrared detector coupled to appropriate circuitry can receive the data carried in the infrared signal and place the data on a bus. The bus may carry data to a memory, from which a processor retrieves and executes the instructions. The instructions received by the memory may optionally be stored on a storage device either before or after execution by the processor.

Figure 2:
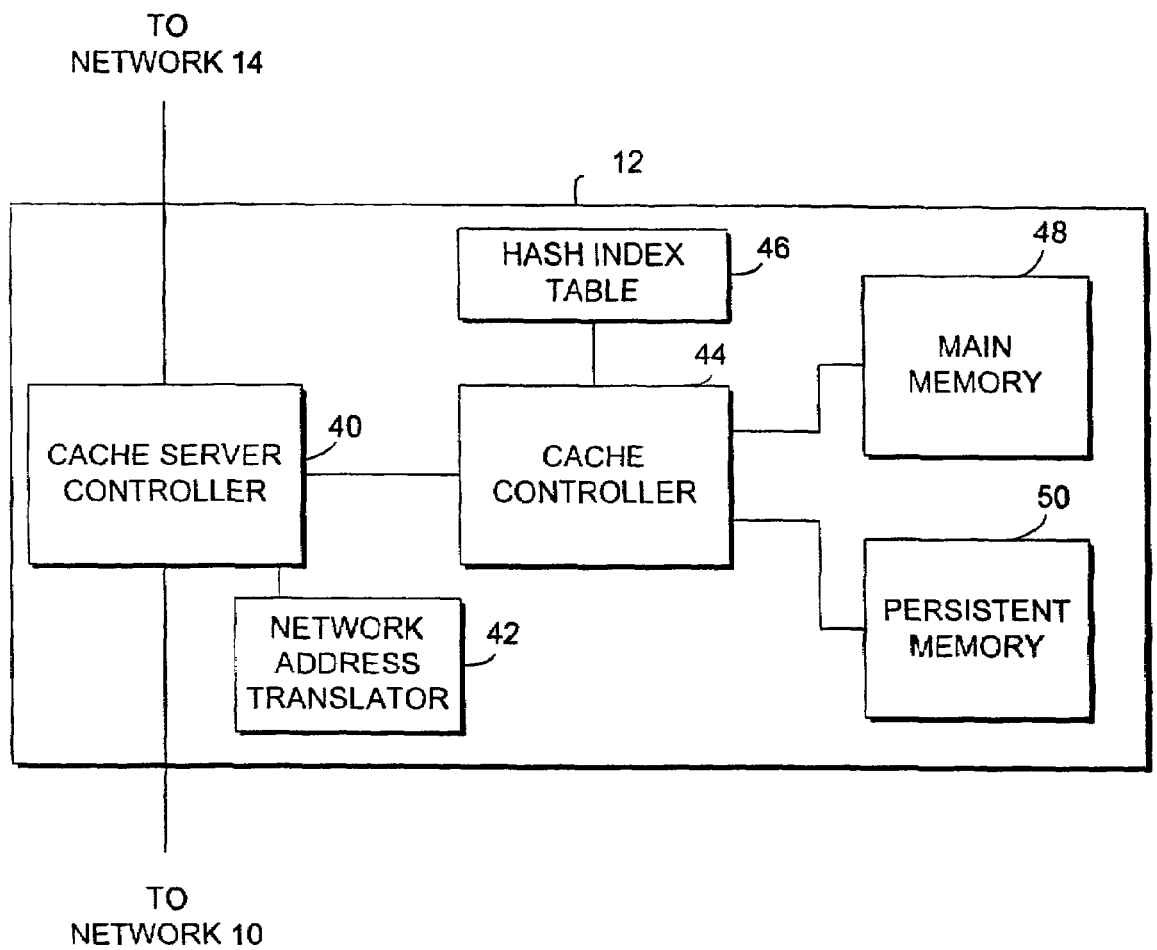
FIG. 2 is a block diagram showing proxy server 12 in greater detail.

FIG. 2 is a block diagram showing cache server 12 in greater detail. Cache server 12 may be implemented by programming a conventional computer, as is well understood in the art. The blocks shown in FIG. 2 may be implemented in hardware, software, or a combination of hardware and software.

Cache server 12 is controlled by cache server controller 40. Cache server controller 40 is connected to a network address translator ("NAT") 42 and a cache controller 44. Cache controller 44 is connected to a hash index table 46, a main memory 48, and a persistent memory 50. Hash index table 46 contains an index of the information cached in main memory 48 and persistent memory 50. Cache server controller 40 receives requests for information from clients 16, 18, and 20, through network 10. For example, client 16 sends a service request message requesting information from origin server 22. Cache server controller 40 receives the service request message and sends the request to cache controller 44. Cache controller 44 accesses information in hash index table 46 to determine whether the requested information is present in main memory 48 or persistent memory 50. If the information is present in main memory 48 or persistent memory 50, cache controller 44 retrieves the information and returns it to cache server controller 40. Cache server controller 40 then forwards the information to client 16, via network 10.

If cache controller 44 determines from hash index table 46 that main memory 48 and persistent memory 50 do not contain the requested information, cache controller 44 sends an indication to cache server controller 40 that the information is not cached. Cache server controller 40 responds by sending a service request message to origin server 22 to request the requested information. Upon receiving the requested information from origin server 22, cache server controller 40 sends the information to client 16. Cache server controller 40 also forwards the information to cache controller 44, which stores the information in main memory 48 and updates hash index table 46 with information defining the location of the new information in main memory 48.

Figure 3:
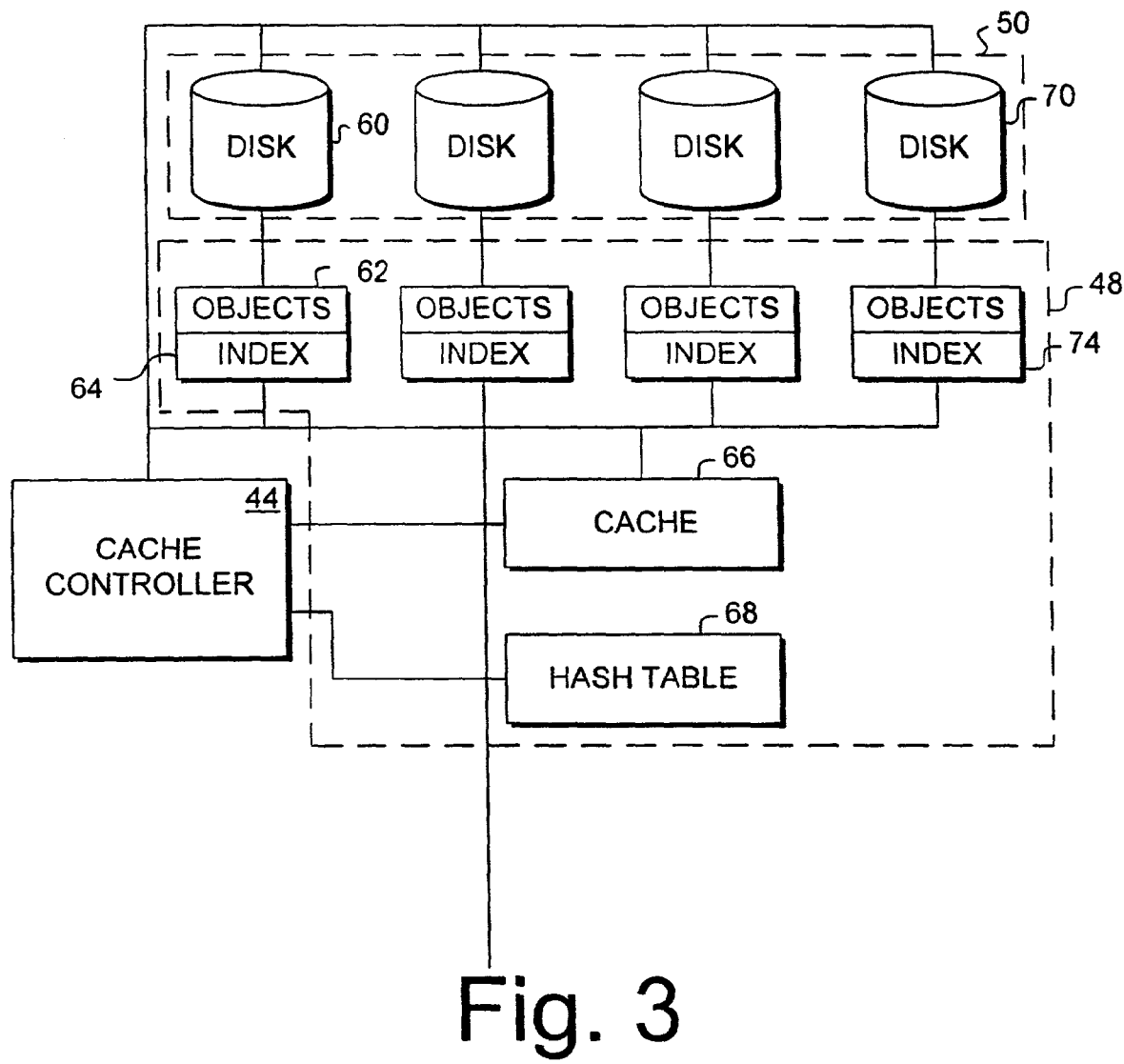
FIG. 3 is a block diagram illustrating the main memory and persistent memory portions of a cache, consistent with the present invention.

FIG. 3 is a block diagram illustrating a system for implementing main memory 48 and persistent memory 50 consistent with the principles of the invention. In one embodiment, persistent memory 50 is comprised of one or more disks 60, 70. Main memory 48 includes object buffers and indexes, such as object buffer 62 and index buffer 64, corresponding to each of the disks in persistent memory 50. Main memory 48 also includes cache 66 and hash table 68. Hash table 68 stores information for accessing entries in cache 66. Cache controller 44 stores information in the disks of persistent memory 50 by staging the information from cache 66 to the index and object buffers of main memory 48, and then writing the buffered information to persistent memory 50.

Buffering the objects and associated index information allows the disks of persistent memory 50 to perform more efficiently because writes can be grouped, thus reducing the overhead of multiple write operations spread across time. This is because many disks require the same amount of time to write a small amount of data as they do to write a larger amount of data and therefore by grouping smaller chunks of data into a larger chunk, more data can be written per unit of time. Although accumulating objects in main memory and grouping writes helps performance, should the system go down, information in the index and object buffers could be lost. To recover, the system must determine where the valid information is located in persistent memory 50. Methods and apparatus consistent with the invention facilitate recovery by writing information to main memory 48 and persistent memory 50 in a particular sequence. The particular sequence of writing operations allows the system to determine the location of valid information in persistent memory 50 more quickly than conventional systems.

Figure 4:
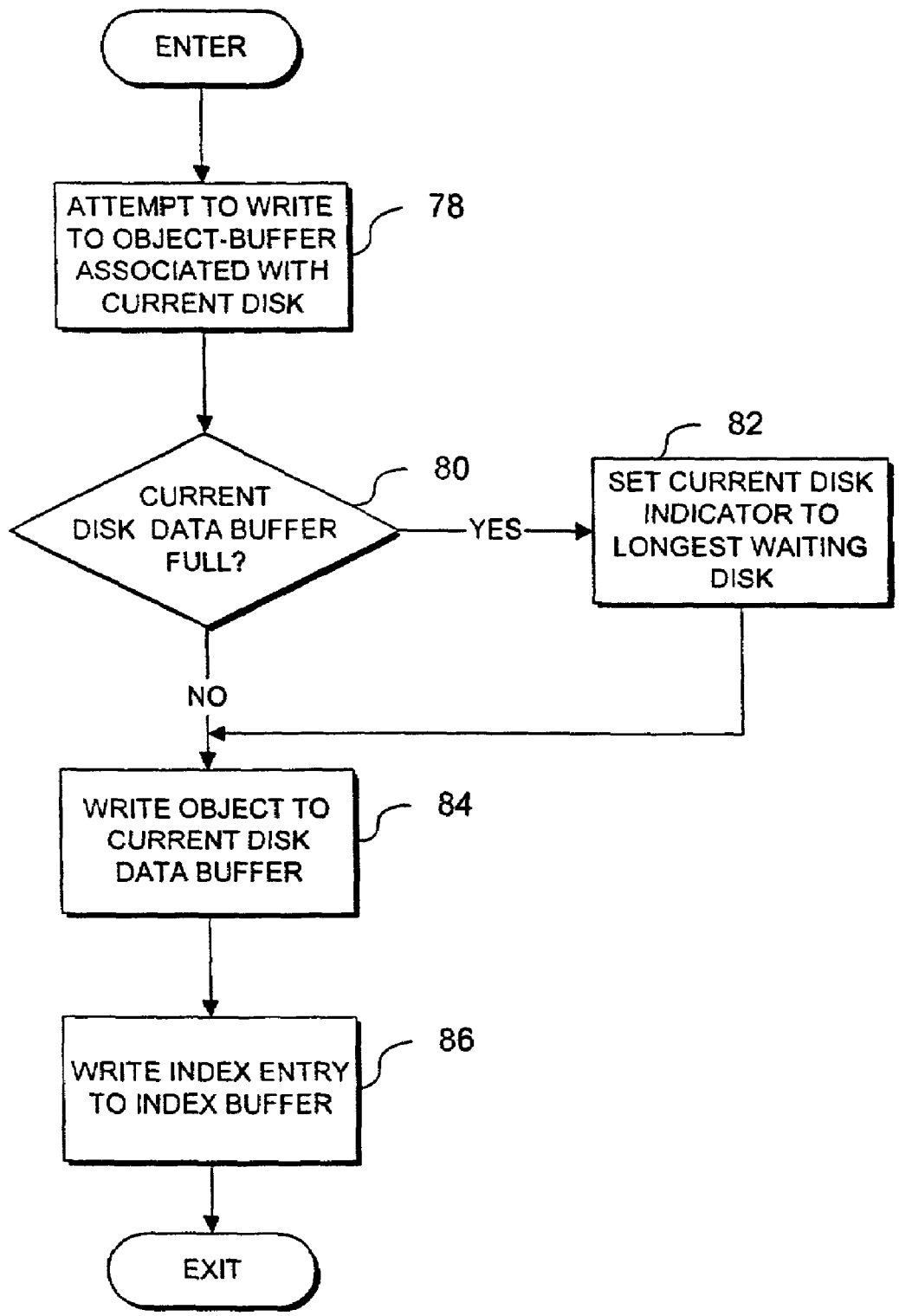
FIG. 4 is a flow chart showing the processing performed by a cache controller when writing an object to a persistent memory cache consistent with the principles of the present invention.

FIG. 4 is a flowchart showing the process performed by cache controller 44 when writing an object to a disk in persistent memory 50. FIG. 4 is described with reference to FIG. 3. In this embodiment, cache controller 44, of FIG. 3, only writes to one disk at a time. The disk currently being written to is referred to as the current disk. Assuming for purposes of discussion that disk 60 is the current disk, cache controller 44, of FIG. 3, first attempts to write the object to corresponding object buffer 62 of the current disk, and corresponding index information related to the object to index buffer 64 (step 78). If object buffer 62 is full (step 80), cache controller 44 sets a current disk indicator to the disk that has been waiting the longest, so that information will be written to the longest waiting disk (step 82). Assuming for the sake of discussion that disk 70 in FIG. 3 has been waiting the longest, disk 70 becomes the current disk. The object is written to the object buffer (step 84) and its index information to its associated index buffer (step 86) of the current disk. For example, if there are only two disks, cache controller 44 writes the object and index information to the object buffer and index buffer associated with the second disk if the object buffer associated with the first disk is full.

The information in each object buffer and index buffer of main memory 48 is periodically written to the respective disks of persistent memory 50. If more than one object buffer is waiting to be written to disk, the object buffer waiting the longest is written first. Similarly, if more than one index buffer is waiting to be written, the index buffer that has been waiting the longest is written first. An index buffer will not be written unless the associated object buffer has already been written. Buffering the objects and index information allows the system to perform writes to persistent memory 50 in one operation. This reduces the performance penalty normally caused in conventional systems by frequent and sporadic writes to persistent memory 50, because in many persistent memory systems, such as disk drives, there is a constant access time associated with writing a discrete block of data whether the entire block is written or only part of that block. Therefore, it can be much more efficient to accumulate data before performing a write operation.

Figure 5:
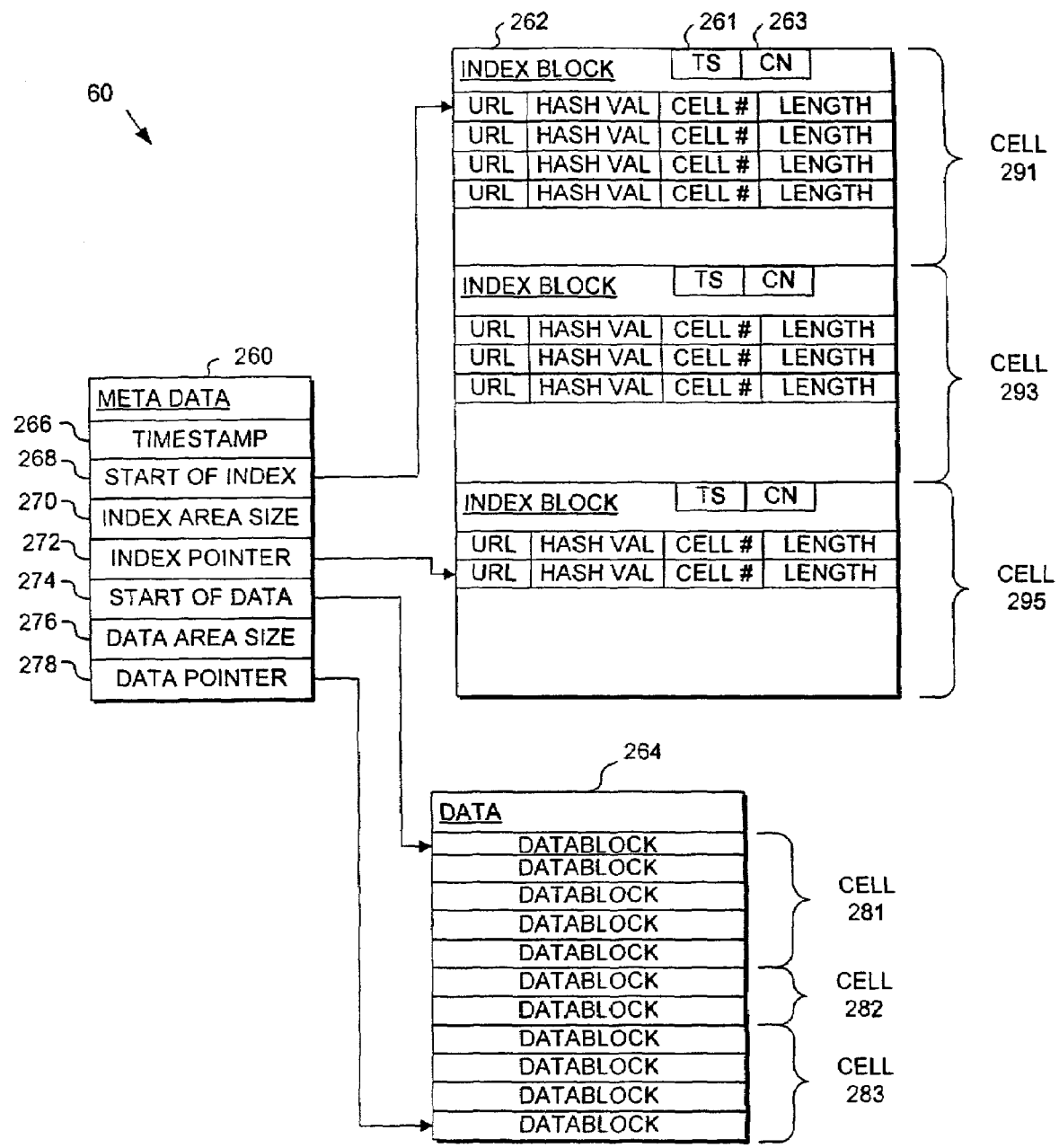
FIG. 5 is a schematic diagram illustrating the contents of a disk consistent with the principles of the present invention.

FIG. 5 is a schematic diagram illustrating memory areas of a disk, for example, disk 60. Disk 60 includes three memory areas: meta data 260, index 262, and data 264. Metadata is data about data, and it contains information about how data is stored and formatted on the disk. Metadata 260 is stored at the same location on each disk, and stores information for accessing index 262 and data 264. Metadata includes a timestamp 266, a start of index pointer 268, an index area size indicator 270, and an index pointer 272, a start of data pointer 274, a data area size indicator 276 and a data pointer 278. Timestamp 266 is stored in metadata 260 at the time disk 60 is initialized. Start of index 268 stores the location where index 262 starts, index area size indicator 270 indicate the size of index 262, and index pointer 272 points to the most recently written index information in index 262. Start of data pointer 274 stores the location where data 264 begins, data area size indicator 276 indicates the size of data 264, and data pointer 278 points to the most recently written data in data 264.

Data 264 stores objects and may be comprised of data blocks of equal size, corresponding to the data block size of the persistent storage device. Objects are stored in groups of one or more data blocks. Each group is called a cell. In FIG. 5, exemplary cells 281, 282, and 283 are illustrated. In one embodiment, data 264 is implemented as a cyclic data structure of cells such that the operation of advancing a pointer past the last cell causes the pointer to point to the first cell.

Index 262 comprises index blocks. Each index block is stored in a respective one of cells 291, 293, or 295. At the time each index block is created, timestamp (TS) 261 and cell number (CN) 263 are written to the index block. Each index entry stores particular information regarding a data cell stored in data 264. More particularly, each index entry stores the URL of the object stored in a data cell, a hash value of the URL, the data cell number, and the data cell size.

Index 262 is only used at startup time to create a hash table in fast main memory. The hash table is used by cache controller 44 to determine the locations of web objects in data 264. In one embodiment, index 262 is implemented as a cyclic data structure of index entries.

Cache controller 44 updates index pointer 272 and data pointer 278 in metadata 260 periodically, but not each time new information is written to index 262 or data 264. The updates are only done periodically because the overhead of performing updates every time index area 262 or data area 264 are updated would be too high and would degrade performance.

Updating index pointer 272 and data pointer 278 only periodically, however, creates problems when the system crashes. For example, if the system crashes after either index 262 or data 264 are updated, but before index pointer 272 or data pointer 278 are correspondingly updated, the pointers will point to areas in each of index 262 or data 264 that are not the most recent entries. What is known, however, is that index pointer 268 and data pointer 278 point to areas that were at one time the most recently written information in index 262 and data 264. Based on this information, cache controller 44 can find index information that at one time was valid, and begin stepping through subsequent entries in index 262 until no valid index entries are found. Of course, if the system crashes at the exact time that index pointer 268 and data pointer 270 are correct, then cache controller 44 can immediately begin using the disk again.

Figure 6:
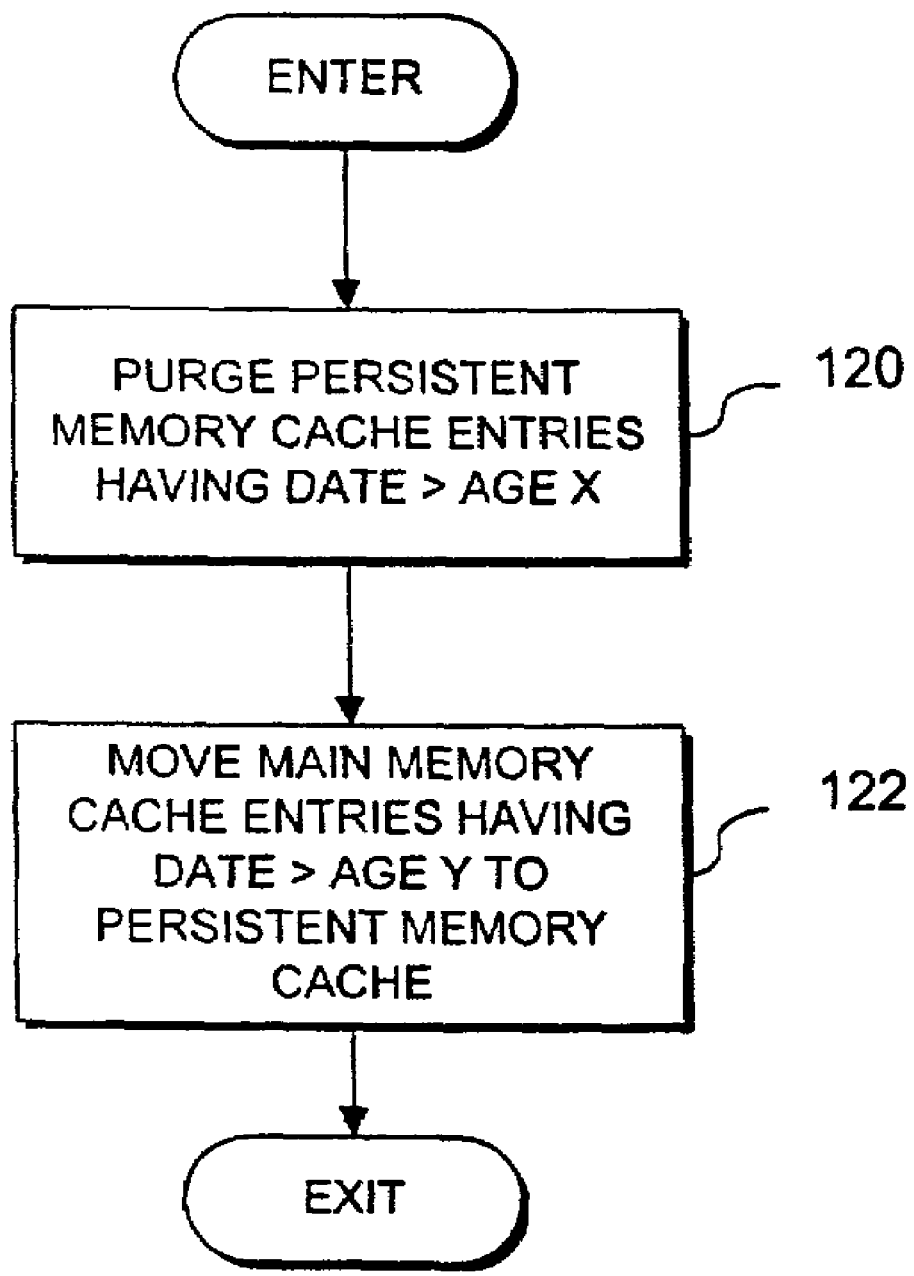
FIG. 6 is a flow chart illustrating the process performed by a cache controller when purging and staging entries in accordance with the principles of the present invention.

FIG. 6 is a flow chart illustrating the process performed by cache controller 44 when purging and staging entries in main memory 48 and persistent memory 50. When an object is buffered in main memory 48 it is given a timestamp which may include a date and a time. The timestamp allows cache controller 44 to determine how old the object is. Periodically, for example, when a certain number of writes have been buffered in main memory 48, cache controller 44 purges entries from persistent memory 50 that are older than a particular age (step 120), and moves entries buffered in main memory 48 having dates greater than a particular age to persistent memory 50 (step 122). Purging entries from persistent memory 50 frees up disk space, and moving entries from main memory 48 frees up buffer space.

Figure 7:
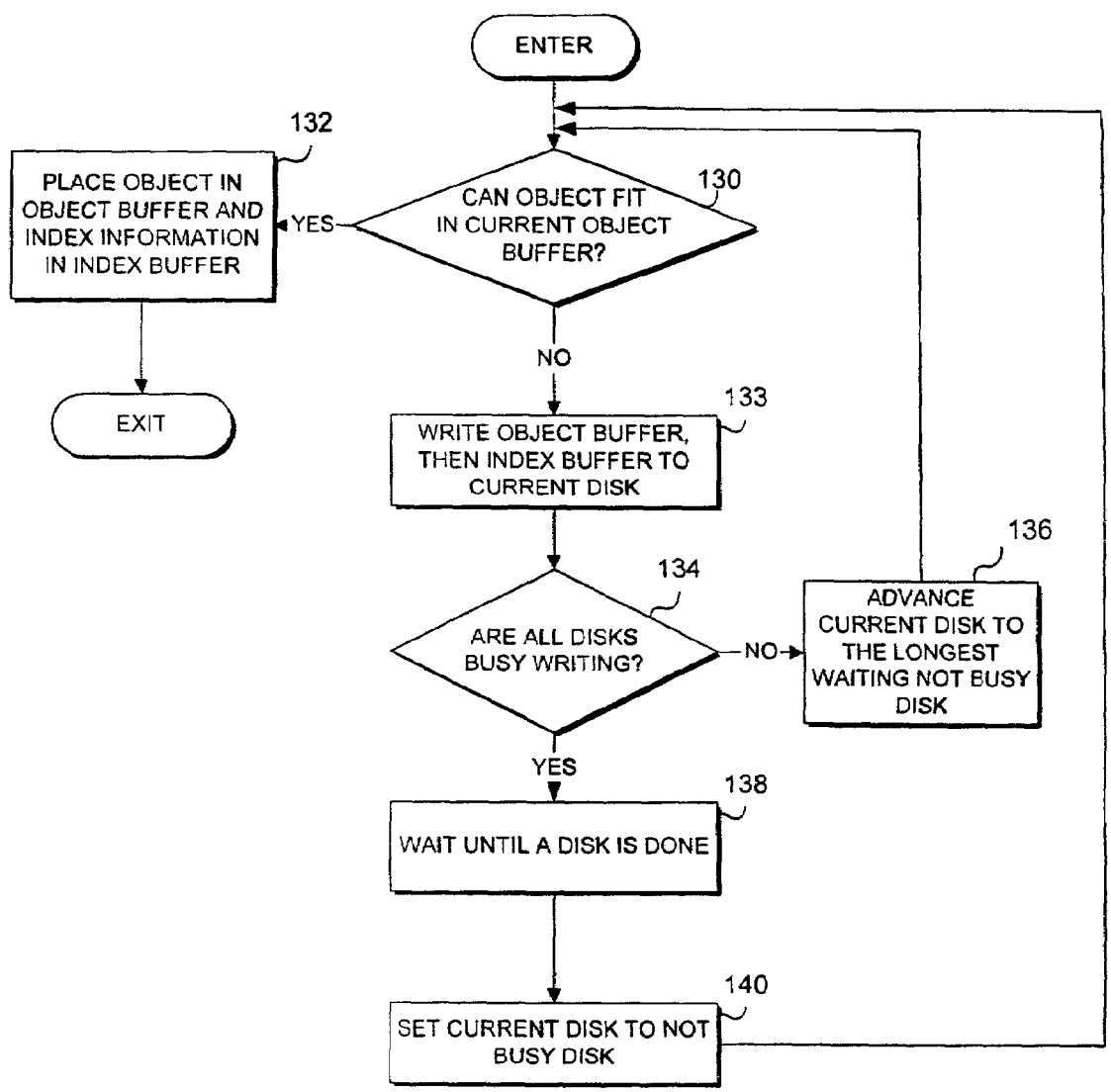
FIG. 7 is a flow chart illustrating the process performed by a cache controller when writing an object to main memory consistent with the principles of the present invention.

FIG. 7 is a flow chart illustrating the process performed by cache controller 44 when writing an object to main memory 48. Using disk 60 of FIG. 5 as an example of the current disk, cache controller 44 first determines whether the object to be written can fit in the object buffer 62 (step 130). If the object fits in object buffer 62, the object is written to object buffer 62 and the index information associated with the object is written to index buffer 64 (step 132).

If the object does not fit in object buffer 62, cache controller 44 writes the object buffer, then the index buffer to the current disk (step 133) and determines whether all disks are busy writing (step 134). If all disks are not busy writing, cache controller 44 makes the longest waiting not busy disk the current disk (step 136), and continues the process of determining whether the object can fit in the new current disk object buffer at step 130. If all disks are busy writing, cache controller 44 waits until a disk is done (step 138), and then sets the current disk to the not busy disk (step 140). The process then continues with cache controller 44 determining whether the object can fit into the new current disk object buffer at step 130.

Figure 8:
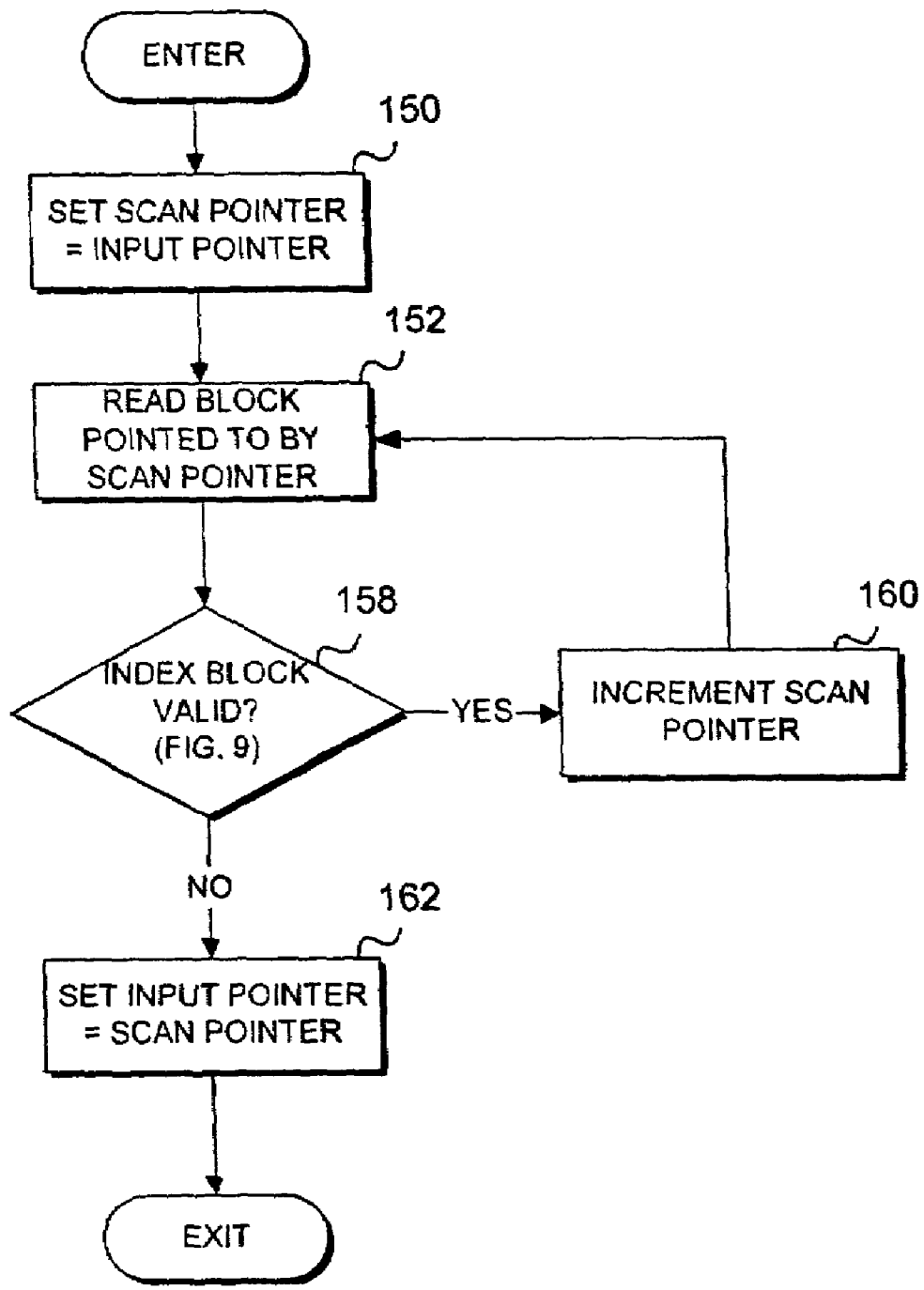
FIG. 8 is a block diagram illustrating the process performed by a cache controller in determining the location of valid information in persistent memory after a system crash consistent with the principles of the present invention.
Figure 9:
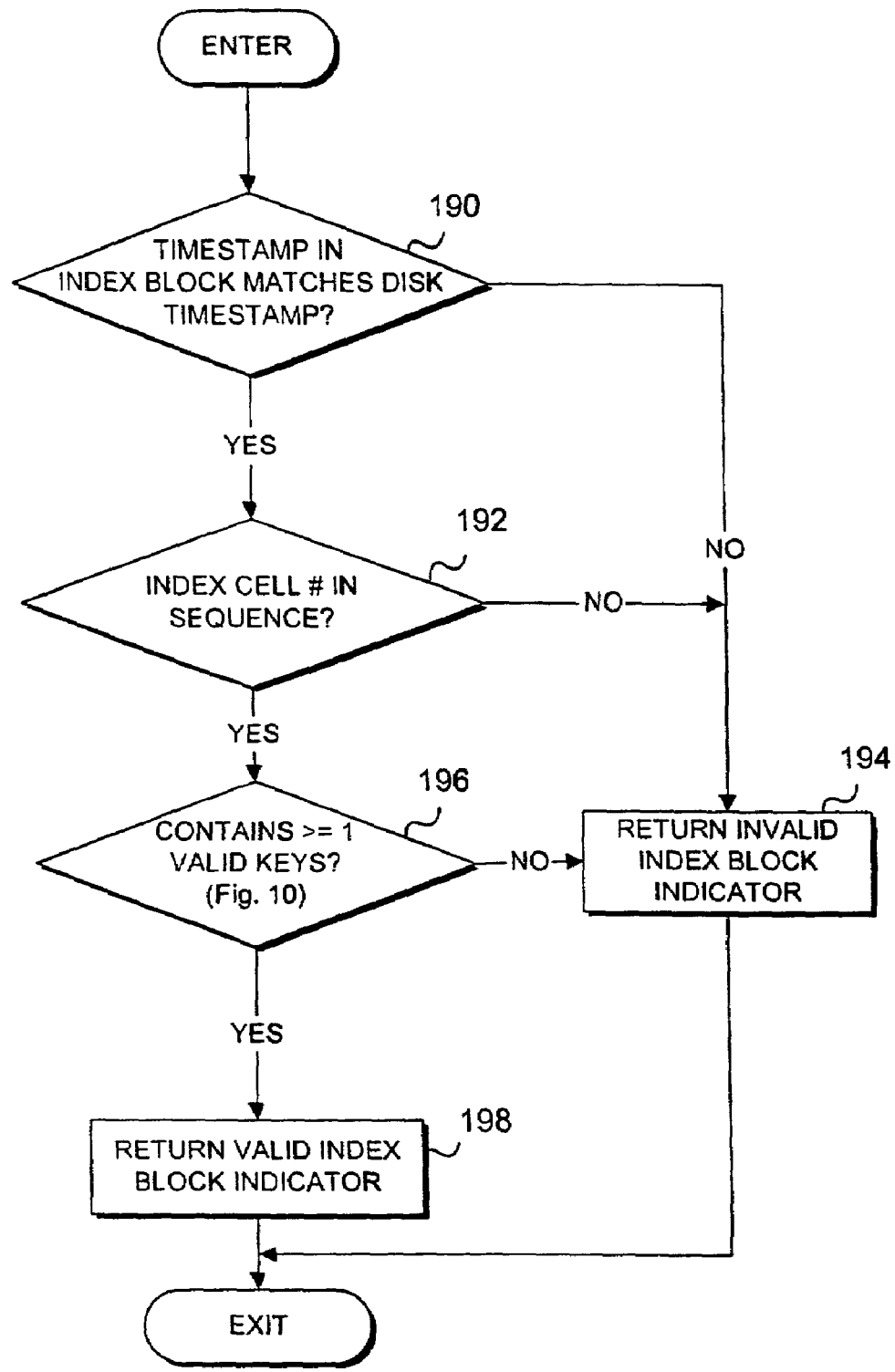
FIG. 9 is a flow chart illustrating the process performed by a cache controller when determining whether an index block is valid consistent with the principles of the present invention.

FIG. 8 is a block diagram illustrating the process performed by cache controller 44 in determining the location of valid information in persistent memory 50 after a system crash. The process is performed for each disk of main memory 50. Using disk 60 of FIG. 5 as an example, cache controller 44 first reads metadata 260 from disk 60 to determine the most recent index pointer, and sets a scan pointer to the value of that index input pointer (step 150). Cache controller 44 then reads the block in index area 262 pointed to by the scan pointer (step 152), and determines whether the index block is valid (step 158). Determining whether the index block is valid is illustrated in FIG. 9. If the index block is valid, the scan pointer is incremented (step 160) and cache controller 44 continues at step 152 by reading the block pointed to by the new scan pointer. If the index block is not valid, cache controller 44 sets the input pointer equal to the scan pointer (step 162). Thus, cache controller 44 has reset the input pointer to the first valid block in index buffer 64.

FIG. 9 is a flow chart illustrating the process performed by cache controller 44 when determining whether an index block is valid (step 158 of FIG. 8). Cache controller 44 first determines whether the timestamp in the index block matches the disk timestamp (step 190). If the timestamp in the index block does not match the disk timestamp, cache controller 44 returns an invalid index block indicator (step 194).

If the timestamp in the index block does match the disk timestamp, cache controller 44 determines whether the index block cell number is in sequence (step 192). If the index block cell number is not in sequence, cache controller 44 returns an invalid index block indicator (step 194).

If the index cell number is in sequence, cache controller 44 determines whether the index block contains greater than or equal to one valid index (step 196). If the index does not contain greater than or equal to one valid index, cache controller 44 returns an invalid index block indicator (step 194). If cache controller 44 determines that the index does contain at least one valid index, then cache controller 44 returns a valid index block indicator (step 198).

Figure 10:
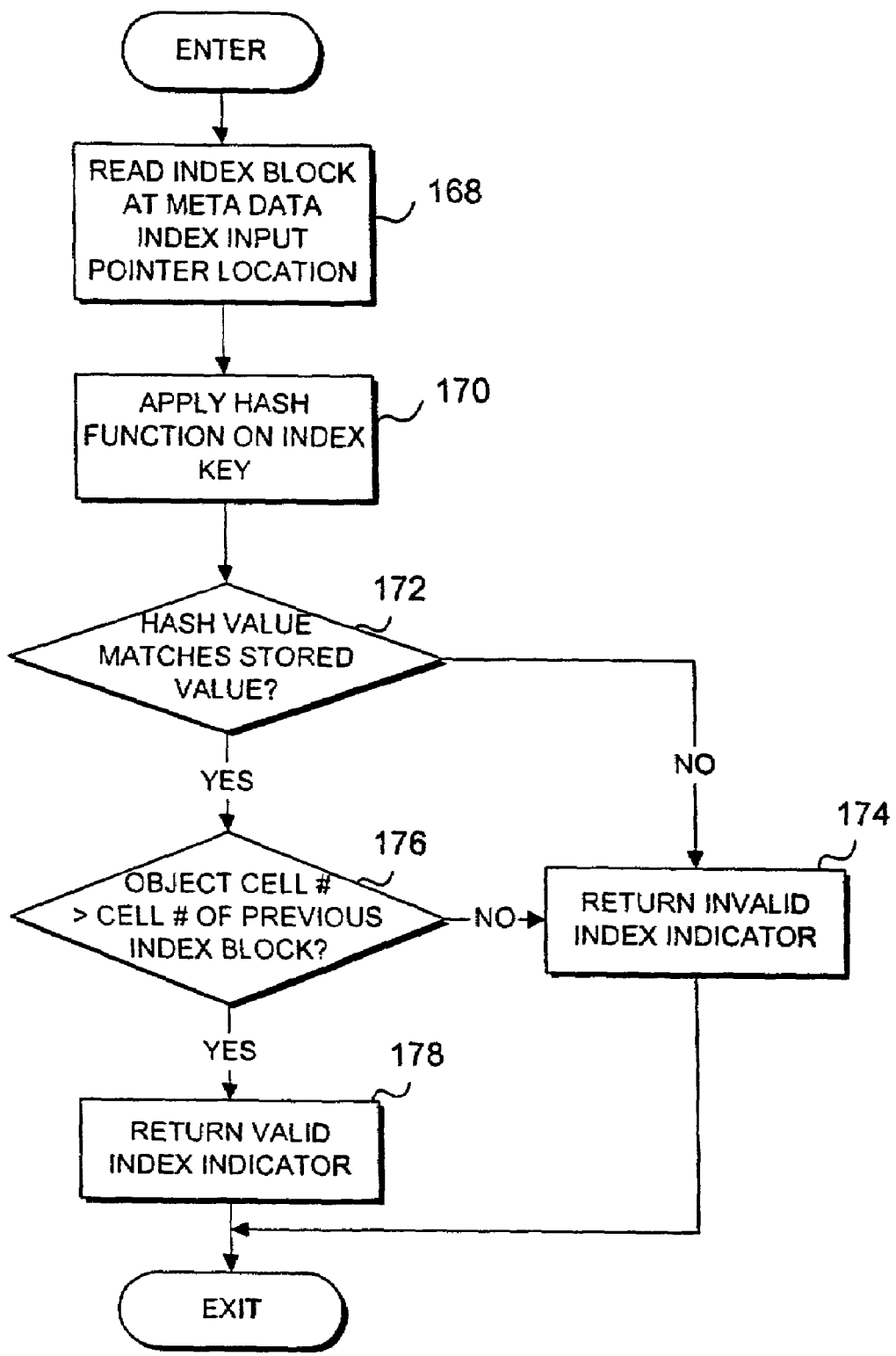
FIG. 10 is a flow chart illustrating the process performed by a cache controller in determining whether an index entry in an index block is valid consistent with the principles of the present invention.

FIG. 10 is a flow chart illustrating the process performed by cache controller 44 in determining whether an index entry in an index block is valid. Cache controller 44 first reads the index entry from the location identified by the index input pointer stored in metadata area 260 (step 168), applies a hash function to the index key of the index entry (step 170), and determines whether the hash value matches the stored value (step 172). If the hash value does not match the stored value, cache controller 44 returns an invalid index indicator (step 174). If the hash value does match the stored value, then cache controller 44 determines whether the object cell number of the index entry is greater than the object cell number of the previous index entry (step 176). If the object cell number is not greater than the previous index entry, cache controller 44 returns an invalid index indicator (step 174). If the object cell number is greater than the object cell number of the previous index block, cache controller 44 returns a valid index indicator (step 178).

It will be apparent to those skilled in the art that various modifications and variations can be made in the caching system and methods consistent with the principles of the present invention without departing from the scope or spirit of the invention. Although several embodiments have been described above, other variations are possible consistent with the principles of the present invention. Other embodiments of the invention will be apparent to those skilled in the art from consideration of the specification and practice of the disclosed embodiments. The specification and examples are exemplary only, and the true scope and spirit of the invention is defined by the following claims and their equivalents.

We claim:

1. A method of caching an object in a computer system having:
   persistent memory comprising multiple disks;
   main memory containing a set of buffers associated with each of the multiple disks, each set of buffers comprising:
   a cyclic object buffer configured to store and retrieve objects by logical block number;
   a cyclic index buffer configured to store index entries corresponding to objects stored in the cyclic object buffer;
   a metadata buffer configured to store information facilitating access to the cyclic object buffer and the cyclic index buffer;
   wherein one of the multiple disks is a current disk and the set of buffers associated with the current disk is a current set of buffers; the method comprising:
   receiving an object from an origin server;
   writing the object to the current cyclic object buffer if the current cyclic object buffer is not full;
   if the current cyclic object buffer is full:
   adopting a longest waiting disk as a new current disk;
   adopting the set of buffers associated with the new current disk as a new current set of buffers;
   storing the object in the new current cyclic object buffer;
   writing an index entry regarding the object to the new current cyclic index buffer; and updating the new current metadata buffer.

2. The method as in claim 1, wherein the object is a web object.

3. The method as in claim 1, wherein said writing an index entry comprises:
   within a first index cell within the new current cyclic index buffer, writing a new index block comprising:
   a time stamp capable of storing a time associated with the index entry; and
   a cell number capable of identifying the first index cell.

4. The method as in claim 1, wherein said writing an index entry comprises writing the index entry to an index block within a first index cell of the cyclic index buffer, the index entry comprising:
   an object identifier capable of identifying the object;
   a hash value corresponding to the object identifier;
   a cell number corresponding to a storage location of the object; and
   a cell size.

5. The method as in claim 4, wherein the object is a web object and the object identifier is a uniform resource locator.

6. The method as in claim 1, wherein the cyclic object buffer comprises:
   cells comprising at least one data block.

7. The method as in claim 1, wherein each metadata buffer is configured to store:
   a timestamp capable of storing a time associated with information stored in the metadata buffer;
   a start of index indicator capable on indicating a location of a beginning of the corresponding cyclic index buffer;
   an index size capable of specifying a size of the corresponding cyclic index buffer;
   an index pointer capable of pointing to a current position within the corresponding cyclic index buffer;
   a start of data pointer capable of indicating a location of the beginning of data within the corresponding cyclic object buffer;
   a data memory size capable of specifying a size of the corresponding cyclic object buffer; and
   a data pointer capable of pointing to a current position within the corresponding cyclic object buffer.

8. In a computer system having main memory and persistent memory, the main memory containing at least one data buffer, the method comprising steps of:
   receiving a request for an object, the request comprising an identifier of the object; and
   accessing a hash index table containing an index of information stored in the main memory and the persistent memory to determine, from the identifier, whether a cached copy of the object is stored in a plurality of data structures, the data structures comprising:
   a cyclic index memory capable of storing index entries comprising an index, the index having a beginning;
   a cyclic object memory capable of storing and retrieving objects by logical block number, the object memory having a beginning; and
   a metadata memory capable of storing information about the index memory and the object memory, the information including:
   a timestamp capable of storing a time associated with information stored in the metadata memory;
   a start of index indicator capable on indicating a location of the beginning of the index within the index memory;
   an index memory size capable of specifying a size of the index memory;
   an index pointer capable of pointing to a current position within the index memory;
   a start of data pointer capable of indicating a location of the beginning of the data within the object memory; a data memory size capable of specifying a size of the object memory;
   a data pointer capable of pointing to a current position within the object memory, wherein determining whether a cached copy of the object is stored in a plurality of data structures further comprises the steps of:

computing a hash value of the identifier; and
accessing the hash index table using the hash value.

9. The system as in claim 8, wherein the object is a web object.

10. The system as in claim 8, wherein the identifier is a uniform resource locator.

11. The system as in claim 8, further comprising:
detecting a crash of the computer system;
determining whether the start of index pointer points to a valid index block;
if the start of index pointer does not point to a valid index block, scanning the index until a valid index block is found or the index is determined to be empty; and
if the start of index pointer does point to a valid index block, scanning the index until an invalid index block is found.

12. An apparatus comprising:
an execution unit capable of executing program code;
persistent memory comprising multiple disks and;
main memory containing a plurality of data structures associated with each of the multiple disks, including:
a cyclic index memory capable of storing index entries comprising an index, the index having a beginning;
a cyclic object memory capable of storing and retrieving objects by logical block number, the object memory having a beginning;
a metadata memory capable of storing information about the index memory and the object memory;
a receiver for receiving a first object from an origin server;
determining whether current data structures are full, wherein the current data structures are associated with a current disk among the multiple disks; and
adopting a longest waiting disk as a new current disk if the current data structures are full; and
an object writer for:
storing the first object in the current data structures if the current data structures are not full; and
storing the first object in new current data structures associated with the new current disk if the current data structures are full.

13. The apparatus according to claim 12, wherein the object is a web object.

14. The apparatus according to claim 12, wherein the object writer comprises:
an index block writer configured to store index blocks, the index blocks comprising:
a time stamp capable of storing a time associated with an index entry; and
a cell number capable of identifying a cell within the cyclic index memory.

15. The apparatus according to claim 14, wherein the index block writer comprises an index element writer configured to write index elements, the index elements including:
an object identifier capable of identifying an object;
a hash value corresponding to the object identifier;
a cell number corresponding to a storage location of the identified object; and
a cell size corresponding to the size of the cell within the index memory.

16. The apparatus according to claim 15, wherein the object is a web object is a web object and the identifier is a uniform resource locator.

17. The apparatus according to claim 12, wherein the cyclic object memory comprises:
cells comprising at least one data block.

18. The apparatus according to claim 12, wherein the metadata memory comprises:
a timestamp capable of storing a time associated with information stored in the metadata memory;
a start of index indicator capable of indicating a location of the beginning of the index within the index memory;
an index memory size capable of specifying a size of the index memory;
an index pointer capable of pointing to a current position within the index memory;
a start of data pointer capable of indicating a location of the beginning of the data within the object memory;
a data memory size capable of specifying a size of the object memory; and
a data pointer capable of pointing to a current position within the object memory.

19. A computer system comprising:
an execution unit capable of executing program code;
persistent memory; and
main memory containing a plurality of data structures, including:
a cyclic index memory capable of storing index entries comprising an index, the index having a beginning;
a cyclic object memory capable of storing and retrieving objects by logical block number, the object memory having a beginning; and
a metadata memory capable of storing information about the index memory and the object memory, the information including:
a timestamp capable of storing a time associated with information stored in the metadata memory;
a start of index indicator capable on indicating a location of the beginning of the index within the index memory;
an index memory size capable of specifying a size of the index memory;
an index pointer capable of pointing to a current position within the index memory;
a start of data pointer capable of indicating a location of the beginning of the data within the object memory;
a data memory size capable of specifying a size of the object memory;
a data pointer capable of pointing to a current position within the object memory;
a receiver for receiving a request for an object, the request comprising an identifier Of the object;
program code for accessing a hash index table containing an index of information stored in the main memory and the persistent memory to determine, from the identifier, whether a cached copy of the object is stored in the plurality of data structures, wherein determining whether a cached copy of the object is stored in a plurality of data structures further comprises the steps of:
computing a hash value of the identifier; and
accessing the hash index a—hash table using the hash value.

20. The computer system according to claim 19, further comprising:
detecting a crash of the computer system;
determining whether the start of index pointer points to a valid index block; and
scanning the index until a valid index block is found or the index is determined to be empty, if the start of index pointer does not point to a valid index block; or scanning the index until an invalid index block is found, if the start of index pointer does point to a valid index block.

21. A computer readable storage medium causing a computer system to perform a method, the computer system having persistent memory comprising multiple disks; and
main memory containing a set of buffers associated with each of the multiple disks, each set of buffers comprising:
a cyclic object buffer configured to store and retrieve objects by logical block number;
a cyclic index buffer configured to store index entries corresponding to objects stored in the cyclic object buffer; and
a metadata buffer configured to store information facilitating access to the cyclic object buffer and the cyclic index buffer; wherein one of the multiple disks is a current disk and the set of buffers associated with the current disk is a current set of buffers, and the method comprising:
receiving an object from an origin server;
writing the object to the current cyclic object buffer if the current cyclic object buffer is not full;
if the current cyclic object buffer is full:
adopting a longest waiting disk as a new current disk;
adopting the set of buffers associated with the new current disk as a new current set of buffers;
storing the object in the new current cyclic object buffer;
writing an index entry regarding the object to the new current cyclic index buffer; and
updating the new current metadata buffer.

22. The computer readable storage medium as in claim 21, wherein the object is a web object.

23. The computer readable storage medium as in claim 21, wherein said writing an index entry comprises:
within a first index cell within the new current cyclic index buffer, writing a new index block comprising:
a time stamp capable of storing a time associated with an index entry; and
a cell number capable of identifying the first index cell within the cyclic index memory.

24. The computer readable storage medium as in claim 21, wherein said writing an index entry comprises writing the index entry to an index block within a first index cell of the cyclic index buffer, the index entry comprising:
an object identifier capable of identifying the object;
a hash value corresponding to the object identifier;
a cell number corresponding to a storage location of the object; and
a cell size.

25. A computer readable storage medium as in claim 21, wherein the cyclic object memory further comprises:
cells comprising at least one data block.

26. The computer readable storage medium as in claim 21, wherein the metadata memory comprises:
a timestamp capable of storing a time associated with information stored in the metadata memory;
a start of index indicator capable of indicating a location of the beginning of the index within the index memory;
an index memory size capable of specifying a size of the index memory;
an index pointer capable of pointing to a current position within the index memory;
a start of data pointer capable of indicating a location of the beginning of the data within the object memory;
a data memory size capable of specifying a size of the object memory; and
a data pointer capable of pointing to a current position within the object memory.

27. A computer-readable storage medium capable of causing a computer system to perform a method, the computer system having main memory and persistent memory, the main memory containing at least one data buffer, and the method comprising the steps of:
receiving a request for an object, the request comprising an identifier of the object; and
accessing a hash index table containing an index of information stored in the main memory and the persistent memory to determine, from the identifier whether a cached copy of the object is stored in a plurality of data structures, the data structures comprising:
a cyclic index memory capable, of storing index entries comprising an—index, the index having a beginning;
a cyclic object memory capable of storing and retrieving objects by logical block number, the object memory having a beginning; and
a metadata memory capable of storing information about the index memory and the object memory, including:
a timestamp capable of storing a time associated with information stored in the metadata memory;
a start of index indicator capable on indicating a location of the beginning of the index within the index memory;
an index memory size capable of specifying a size of the index memory; an index pointer capable of pointing to a current position within the index memory;
a start of data pointer capable of indicating a location of the beginning of the data within the object memory;
a data memory size capable of specifying a size of the object memory; and
a data pointer capable of pointing to a current position within the object memory, wherein determining whether a cached copy of the object is stored in a plurality of data structures further comprises the steps of:
computing a hash value of the identifier; and
accessing the hash index a—hash table using the hash value.

28. The computer readable storage medium as in claim 27, wherein the identifier is a uniform resource locator.

29. The computer readable storage medium as in claim 27, the method further comprising:
detecting a crash of the computer system;
determining whether the start of index pointer points to a valid index block;
if the start of index pointer does not point to a valid index block, scanning the index until a valid index block is found or the index is determined to be empty; and
if the start of index pointer does point to a valid index block, scanning the index until an invalid index block is found.

* * * * *